Figure 1:
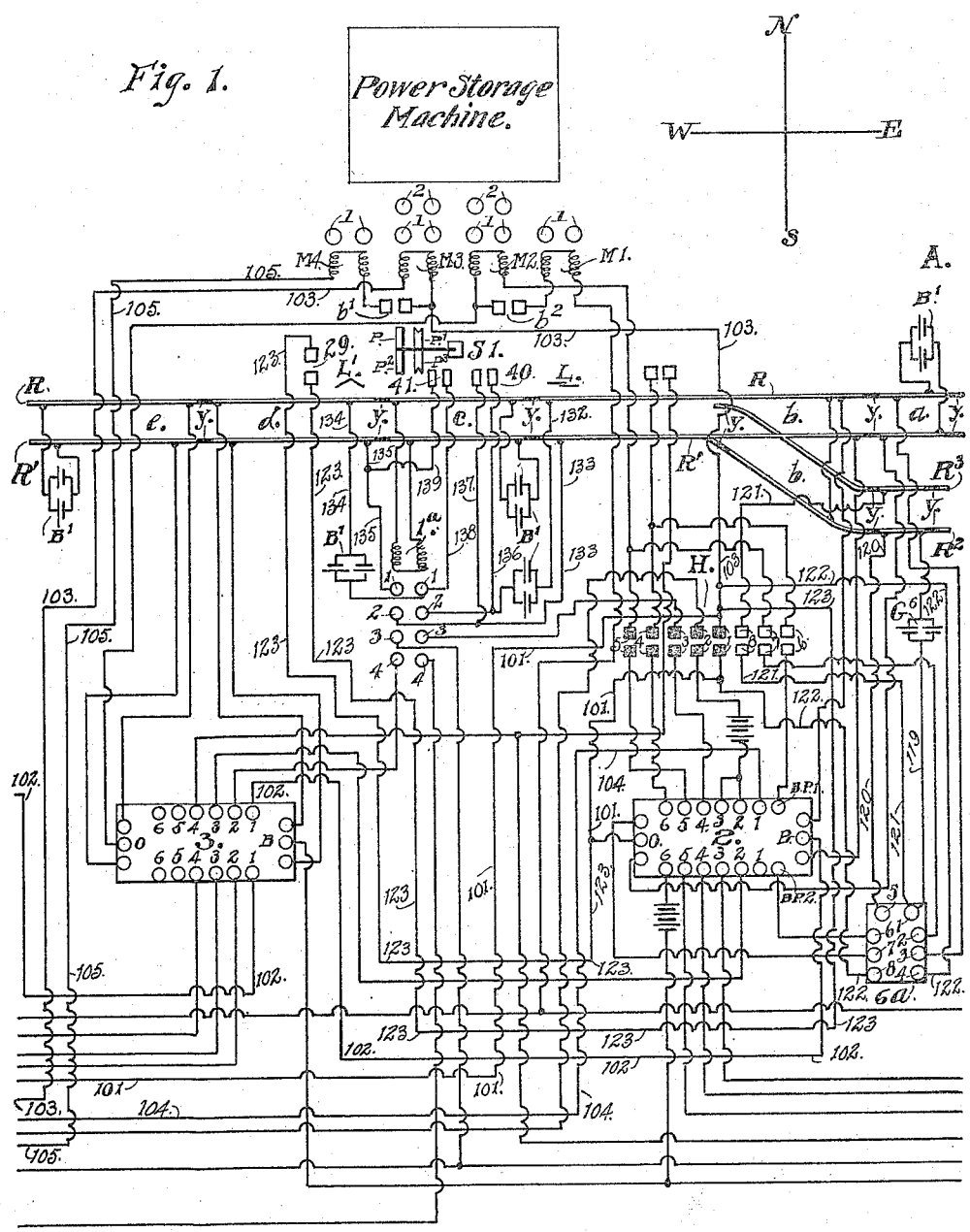

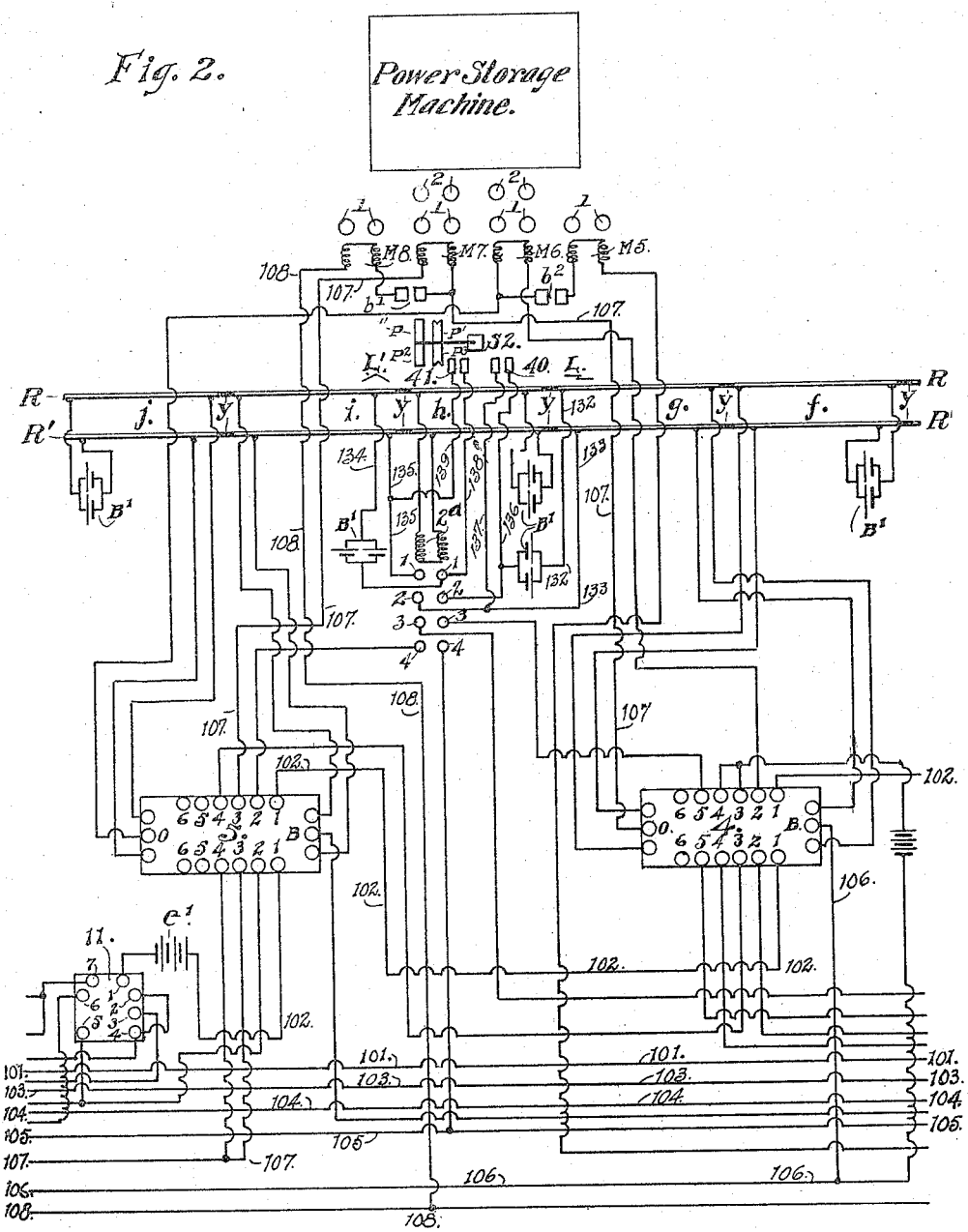

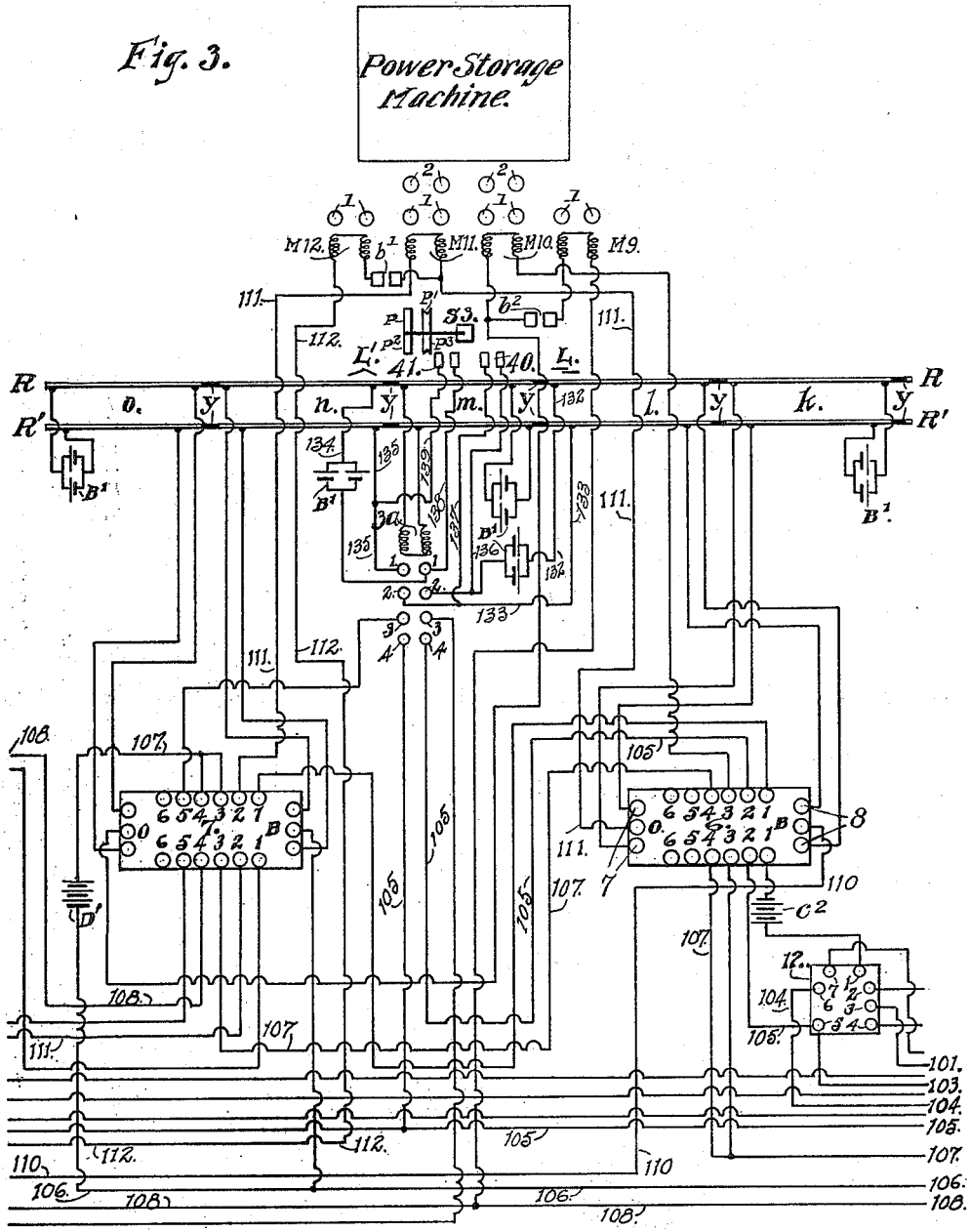

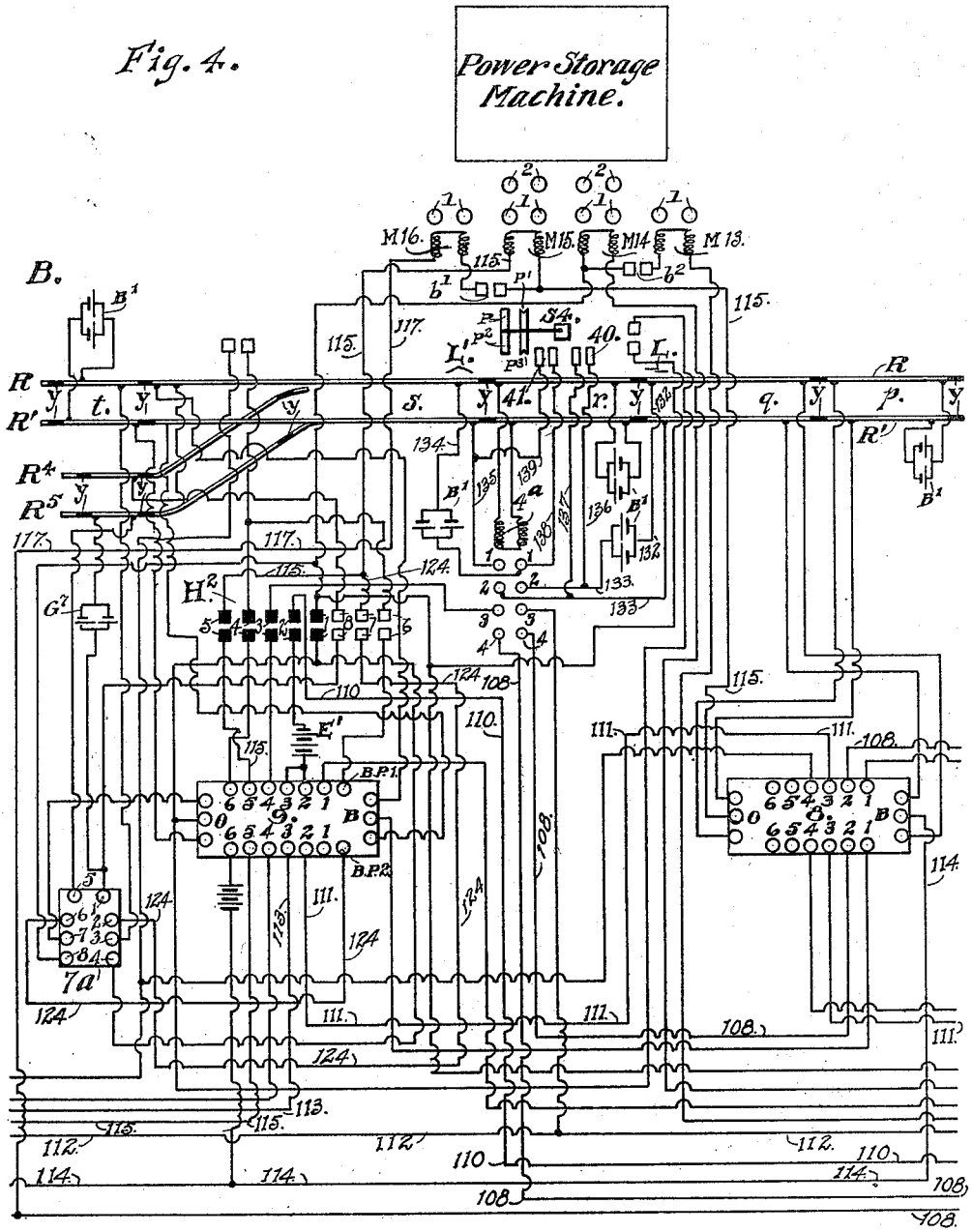

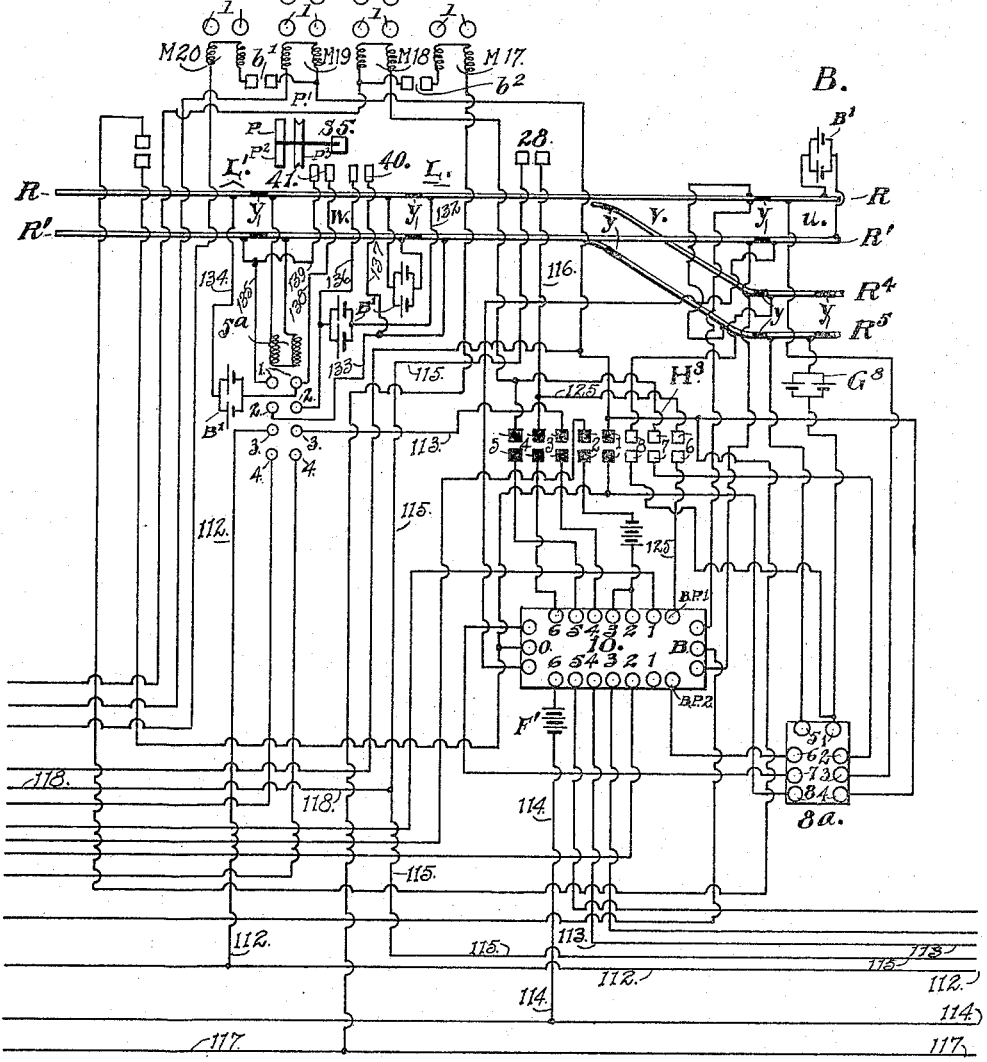

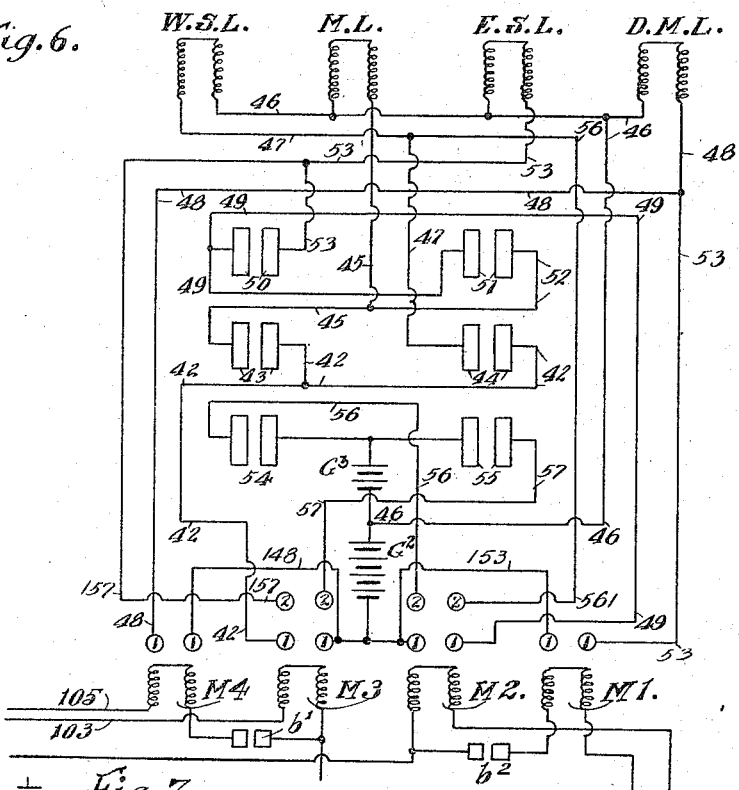
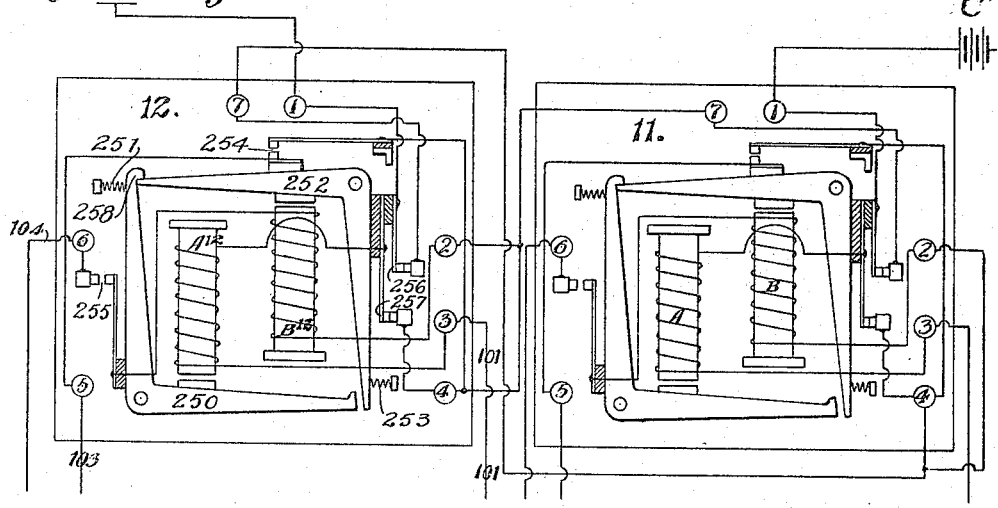

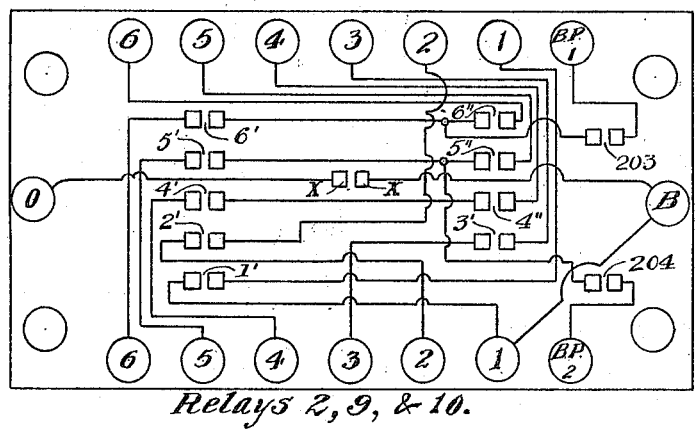
Relays 2, 9, & 10.
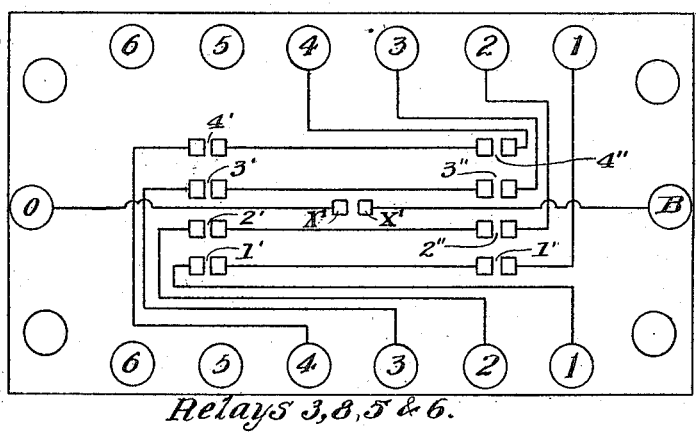
Relays 3, 8, 5 & 6.
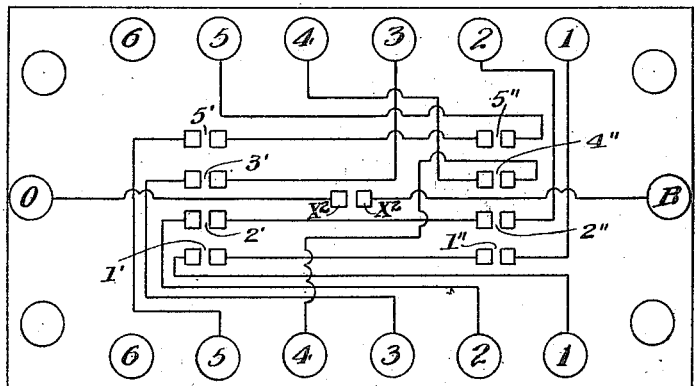
Relays 4 & 7.

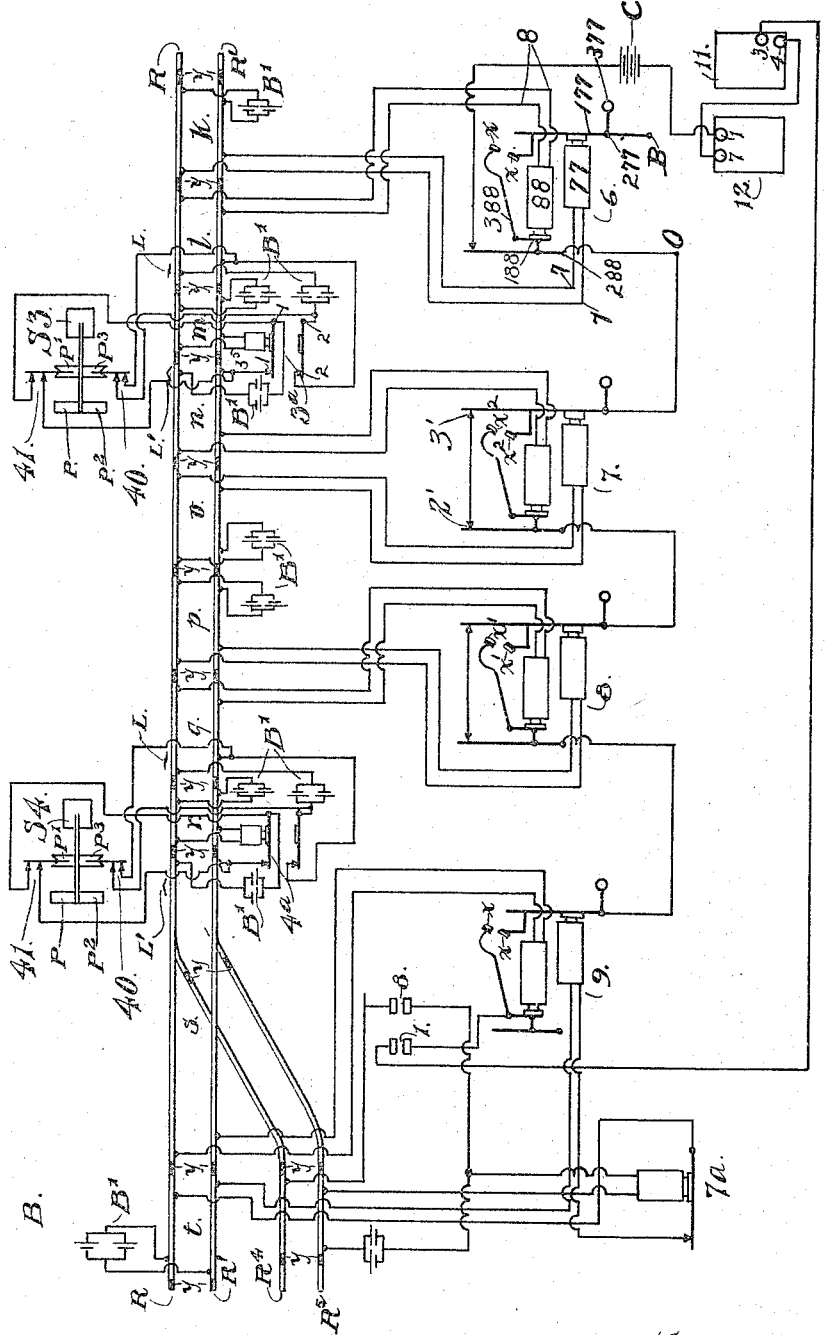

UNITED STATES PATENT OFFICE.

BENTON C. ROWELL, OF CHICAGO, ILLINOIS; LILLA C. ROWELL EXECUTRIX OF SAID BENTON C. ROWELL, DECEASED.

SYSTEM FOR AUTOMATIC CONTROL OF RAILWAY-TRAINS.

1,193,471.  Specification of Letters Patent.  Patented Aug. 1, 1916.

Application filed October 6, 1910. Serial No. 585,580.

*To all whom it may concern:*

Be it known that I, BENTON C. ROWELL, a citizen of the United States, residing in Chicago, in the county of Cook and State of Illinois, have invented a new and useful Improvement in Systems for the Automatic Control of Railway-Trains, of which the following is a specification.

This invention relates to a system of automatic control of railway trains, and more specifically to the electric wiring used in connection with a block signal system for electrically controlling the power mechanisms whereby the signals are positioned and the trains controlled.

The invention has been devised more especially for use on single track railroads, having the passing stations at considerable distances apart and having trains running both ways, but many of the features of the invention are adapted to be used on double track railways, as will be apparent from the following description and claims.

The construction of the apparatus is designed to make it impossible for one train to collide with another, either in head-on or rear end collisions. The construction is also such that several trains may be permitted to run on a single track in the same direction, the number depending upon the length of the track and the number of signal stations therealong, and at the same time to prevent a train at a passing station headed in the opposite direction from gaining access or control of the track between the passing stations until all of the trains thereon have passed by the waiting train at the passing station, it being immaterial whether the waiting train is standing on the main or the side track at the passing station.

The apparatus embraces two or more signals, and by the term "signals" I mean not only blocking appliances or semaphores which warn the engineer to stop or slow the train, but also signals or devices or instruments which automatically compel the train to stop; means automatically controlled for shifting the signals from safety to danger and vice versa: means controlling the automatic safety shifting appliances, governed by a train going in a certain direction and so arranged that when a train going in that direction has gained control, no other trains going in the opposite direction can operate any conflicting or opposing signals until the train having control and all other trains, (if there be more than one) going in the same direction, have passed.

My invention further consists in means electrically automatically controlled which coöperate with a suitable device on the locomotive to stop a train if the engineer disregards a danger signal set against it, and means for compelling a train to reduce speed to any desired degree, when a signal indicates caution, or if the speed is not so reduced, the train is compelled to stop. It is also designed to permit opposed trains to approach under caution a passing station simultaneously without stopping if the switches are so set as to leave one train on the main track and send the other to the side track, but if the switches are so set as to send both trains onto the same track, either the main or the side track, then both trains are automatically compelled to stop.

More particularly, my invention embraces two or more sets of signals, one at the end of each section, each section being divided into a number of blocks, each block being provided with a set of signals, and each set of signals comprising preferably a home and a distant signal for trains going in each direction and all normally set at danger; track circuits in combination with the circuits for controlling the signals, the latter acting in accordance with the direction in which the train is traveling; selector circuits for controlling the selecting mechanism and causing it to select and operate the proper signals so that the signals given shall accord with the direction of movement of the train; a locking circuit for holding the armature of the selector magnets at each station in either position to which it is moved by said selector magnets; two track instruments or train stops located adjacent each signal station, said track instruments being mechanically connected so that when one is at danger, the other is at safety and vice versa, or in other words, one of the track instruments is always in a position to stop the train, these track instruments being separated at predetermined distances, which may be varied, and so operated from the visual signals that if the home signal is set against the train running by it, one or the other of the track instruments will stop the train, or if the home signal is clear, but the distant or caution signal indicates a slow speed, the train will pass by the first of the track instruments which will be set at safety, but will be stopped by the second track instrument if the train has not been slowed down sufficiently, and the second track instrument been given sufficient time to be moved to safety position; a pair of unset relays, the control of which having been obtained by one train going in one direction, then operates to break all the opposed circuits and keep them broken until the train has passed through the section, and which also hold the circuits in its rear open until the train has traveled a prescribed distance beyond the blocks or sub-sections controlling them.

My invention furthermore consists in the improvements in the parts and devices and in the novel combinations of parts and devices herein shown, described or claimed.

Figure 11:
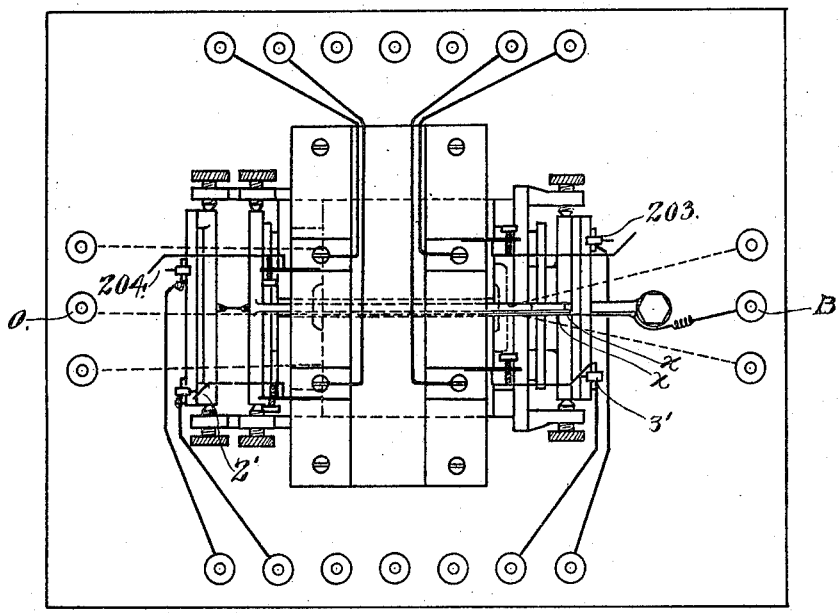

In the drawing, Figures 1, 2, 3, 4 and 5 taken together form a diagram of my invention showing its system of operation through an extended length of track. Fig. 6 is a diagram of the wiring controlling the selector of the power machine of one of the signal stations. Fig. 7 is a detail diagrammatic view of the unset relays which control the circuits. Figs. 8, 9 and 10 are diagrammatic views of the wiring of the reversely operable relays for each block of the section. Fig. 11 is a plan, and Fig. 12 an elevation of the mechanism used in one of the reversely operable relays. Fig. 13 is an enlarged, detail, diagrammatic view of the selector magnets and immediate wiring for controlling the same, and Fig. 14 is a diagrammatic view illustrating more specifically than Figs. 1, 2, 3, 4 and 5, the manner of connecting the relays 6, 7, 8 and 9 and other of the mechanisms to the tracks.

I have shown my improvements as applied to a section of a single track railway between two passing stations A and B, the rails of the main track being designated as R and $R^1$, and the rails of the side tracks as $R^2$ and $R^3$ at station A, and as $R^4$ and $R^5$ at station B. The section of track shown is divided into a plurality of blocks, and at the end of each block is located a signal station, these being referenced as S1, S2, S3, S4 and S5, respectively, and it will be understood that at each signal station there is provided a power storage machine of any suitable construction, which I have not illustrated in detail, but have indicated conventionally as a "power storage machine." This power storage machine is adapted to be controlled by the circuits shown in the drawings forming a part of this application and about to be described, and each power station machine operates both the home and distant signals, which may be of any well known form, and which I have indicated as composed of four blades P, $P^1$, $P^2$ and $P^3$ at each signal station S1, S2, S3, S4 and S5, of which P and $P^1$ are for the control of trains going in one direction and $P^2$ and $P^3$ for the control of trains going in the opposite direction. Each of these arms or signals is preferably normally at danger and adapted to be raised to and lowered from a horizontal position by automatic shifting appliances operated from the power storage machine but as will be apparent to those skilled in the art, a three-position single signal arm may be used. Each power storage machine coöperates with a suitable selecting mechanism adapted to select the signals to operate them in accordance with the direction of the trains, such selection being controlled by the circuits herein set forth.

Adjacent each signal station alongside the tracks are track instruments or train stops referenced L and $L^1$, which may be of any suitable construction, so arranged that when either of them is in its raised or danger position, it will automatically operate mechanically on a coöperating suitable device on a locomotive as the latter passes thereover, to throw on the brakes and stop the train. These track instruments are so constructed and mechanically connected together that when one of them is raised, the other must be lowered, and vice versa.
These track instruments may be placed on both sides of the track, but I have shown only two of them at each signal station, in order to avoid crowding of the drawings. And these track instruments, as will be described later, are automatically operated in accordance with the signals P, $P^1$, $P^2$ and $P^3$.

The rails R, $R^1$, $R^2$, $R^3$, $R^4$ and $R^5$ are divided into a plurality of short track subsections by means of insulations $v$, those on the main track being designated by the letters of the alphabet from $a$ to $w$, both inclusive, from passing station A to the passing station B. Each of these sub-track sections is supplied with current from ordinary track batteries, as indicated at $B^1$, some of said batteries being directly connected to the rails, and others having circuits passing through contact points in various relays. Each block of the track is provided with two reversely operable relays, referenced 2 and 3, 4 and 5, 6 and 7, and 8 and 9, respectively, at signal stations S1, S2, S3 and S4; only a single one, 10, being shown at S5 on account of the fact that this is the last station shown on the drawings, although it is apparent that my system of wiring may be duplicated indefinitely for additional length of track. The even numbered reversely operable relays 2, 4, 6, 8 and 10 are adapted to close a certain circuit in each only when operated by west-bound trains, and the odd numbered reversely operable relays 3, 5, 7 and 9 are likewise controlled by east-bound trains. These reversely operable relays 2 to 10 inclusive, are shown only conventionally in Figs. 1 to 5 with their binding posts or terminals, but their interior wiring is shown more specifically in Figs. 8, 9, 10, 11, 12 and 14. All these reversely operable relays, 2, 9 and 10; 3, 5, 6 and 8; and 4 and 7 are similarly wired, and a detailed description of the same may be found in my Patent No. 695649, but I will briefly describe the operation of one of them, it being understood that all are operated similarly.

Referring to Figs. 9 and 14 and the relay 6. Reversely operable relay 6 comprises two magnets 77 and 88, the magnets being both normally energized from track batteries $B^1$, the wires for magnet 88 entering at the binding posts 8—8 and being connected to the track sub-section $l$ and the wires for magnet 77 entering at the binding posts 7—7 and being connected to the track sub-section $k$. The magnet 77 attracts the armature 177, pivoted at 277 and having a balance weight 377 thereon, and a terminal contact $x^1$ which is insulated on its rear side as indicated in black in Fig. 14. The magnet 88 attracts the armature 188, pivoted at 288 and operating a member 388 having also a terminal $x^1$ similar to that on armature 177. These terminals are electrically connected to the binding posts B and O on the reversely operable relay and are normally disconnected from each other, or, in other words, there is normally a break in the reversely operable relay between the points O and B. When the magnets 77 and 88 are energized, as is the condition when no train is on either sub-section $k$ or $l$ of the track, the contacts 1' and 1'', 2' and 2'', 3' and 3'' and 4' and 4'' (see Fig. 9) are closed, while $x^1$—$x^1$ is open.

Upon a west-bound train passing into the sub-section $k$ of the track, the magnet 77 will be deënergized due to the track battery for $k$ being short circuited, and immediately the armature 177 falls back and the contacts 1', 2', 3' and 4' are opened, thus breaking all circuits between the binding posts 1—1, 2—2, 3—3 and 4—4 of the reversely operable relay. When the train reaches the sub-section $l$ of the track, magnet 88 is deënergized and the contacts 1'', 2'', 3'' and 4'' are opened, and at the same time the armature 188 is released and the member 388 falls and the contact $x^1$ thereon will engage the contact $x^1$ on the armature 177, thus completing the circuit between the posts O and B of the reversely operable relay and leaving all other circuits open between the binding posts 1—1, 2—2, 3—3 and 4—4. Upon the train leaving the sub-section $k$, the magnet 77 becomes energized, but the armature 177 cannot be moved inwardly because of the terminal $x^1$ on the member 388 which will prevent it. However, after the train has passed off of sub-section $l$, magnet 88 is energized, the armature 188 is attracted, thus releasing 177 and allowing it also to be attracted, and this operation restores the reversely operable relay to its normal or original condition wherein $x^1$—$x^1$ are disconnected and the other circuits are closed within the relay.

Reversely operable relay 6, being even-numbered, is operated only by west bound trains in the manner described. When an east-bound train reaches the sub-section $l$ of the track, magnet 88 is deënergized, thus allowing the member 388 to fall, but in this case the terminal $x^1$ will fall to a position in back of the terminal $x^1$ on the armature 177 and will engage the insulation thereof, thus breaking the circuits between the binding posts 1—1, 2—2, 3—3 and 4—4 at 1'', 2'', 3'' and 4'', respectively, but still leaving the circuit between the binding posts O and B, open. When the train reaches sub-section $k$ of the track, the magnet 77 will be deënergized, and the armature 177 will move sufficiently to open the contacts at 1', 2', 3' and 4', but the full movement of the armature 177 will be abridged as it is held by contact $x^1$ on the member 388. As the train leaves the sub-section $l$, magnet 88 becomes energized again and the armature 188 is attracted thereby, thus allowing $x^1$ on member 388 to release $x^1$ on the armature 177, which latter then falls back still farther and keeps $x^1$—$x^1$ open and the circuits between the posts 1—1, 2—2, 3—3 and 4—4 within the reversely operable relay at contacts 1', 2', 3' and 4', also open. As the train passes off of sub-section $k$, 77 is energized again and the armature 177 attracted, thus closing the breaks in the circuits at 1', 2', 3' and 4'. But it will be noticed that a train going east will always keep all circuits within the reversely operable relay 6 open while on the sub-sections $k$ and $l$. Each of the even-numbered reversely operable relays are wired to the tracks so as to be operated by west bound trains in the same manner as reversely operable relay 6, to make the connections between the points O—B, but the odd numbered relays are wired so as to be operated only by east-bound trains to complete the circuits between the O—B binding posts.

Figure 12:
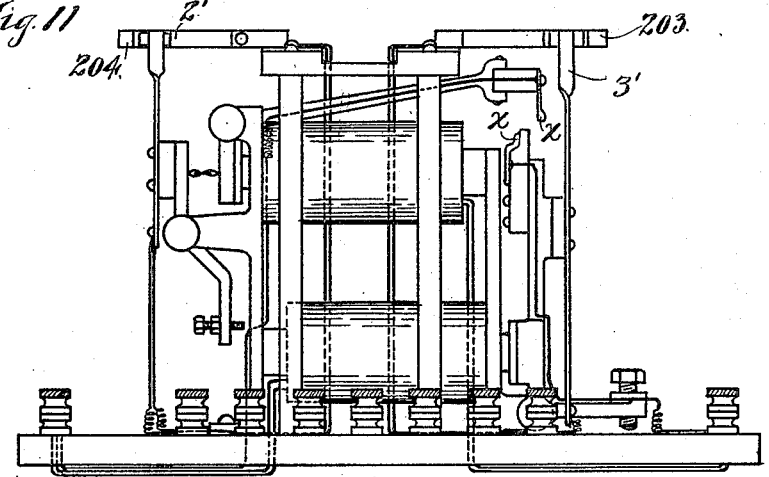
Figure 13:
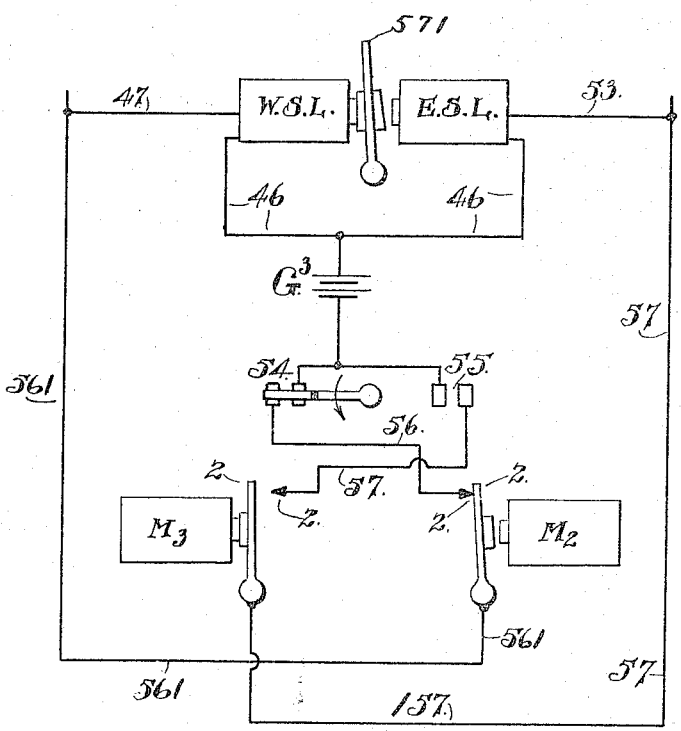

The reversely operable relays 2, 9 and 10, see Figs. 8, 11 and 12, are provided, in addition to the normally bridged points 1', 2', 3', 4', 5' and 6' and 4'', 5'' and 6'', with back points 203 and 204 which are normally open, but are closed when the other points are opened, these back points having terminals referenced BP1 and BP2, respectively, and being essential in connection with the side tracks. From the foregoing, it is thought that the operation of all the reversely operable relays numbered 2 to 10 inclusive, will be fully understood.

At each signal station, there is provided an ordinary track relay, these being referenced 1ª, 2ª, 3ª, 4ª and 5ª, connected to the sub-sections $c$, $h$, $m$, $r$ and $w$ at the signal stations S1, S2, S3, S4 and S5 respectively. All of these track relays are identical, and a description of one only will be given. By referring to Figs. 3 and 14, and the track relay 3ª, it will be seen that the magnet $3^5$ of the same is normally energized from the track battery $B^1$ connected to the sub-section $m$, in which condition the contacts 1—1 and 2—2 are closed, as clearly shown in Fig. 14, by the armatures bridging the gaps between these points. The points 3—3 and 4—4, shown in Fig. 3, are also normally closed or bridged similarly to the points 1—1 and 2—2, and when the magnet $3^5$ is deënergized by a train on sub-section $m$, the short circuiting of the track battery will cause all of these points to be opened.

Track relays of a slightly different type are shown at 6ª, 7ª and 8ª for use in connection with the side tracks. In each of these relays, the points 2 and 6, and 3 and 7, are normally bridged by means of an energized magnet having its terminals at 1 and 5, and supplied respectively from side track batteries $G^6$, $G^7$ and $G^8$. The back points 8—4 of each side track relay are normally open, but these points are closed or bridged when the points 2—6 and 3—7 are opened by the deënergizing of the magnet.

Switch circuit breakers are indicated at H, $H^2$ and $H^3$, which are mechanically operated by and connected to adjacent rail switches for the side tracks, and each circuit breaker has eight sets of contacts therein, those numbered 1, 2, 3, 4 and 5, and indicated as black in the drawing, being closed or bridged when the rail switch is set for a train for the main track, and open when the rail switch is set to pass a train onto the side track. The contacts or points 6, 7 and 8 are open when the rail switch is set for the main track and closed when the rail switch is set to pass a train onto the side track. At each signal station are four switches 41, $b^1$, 40 and $b^2$, all of which are mechanically operated, the switches $b^1$ and $b^2$ being closed by the signal arms P and $P^2$, respectively, when the same go to clear, and the switches 41 and 40 being closed when the distant signal arms $P^1$ and $P^3$, respectively, are at caution. At each signal station there are also four normally deënergized relays referenced M1 to M20, inclusive, which control the selector mechanisms that control the power storage machine by which the arms P, $P^1$, $P^2$ and $P^3$ are operated. Inasmuch as each set of four of these relays at each signal station is the same, as is also each selector mechanism, I will describe only one set, namely, that for the signal station S1, and the detailed wiring for each is shown more particularly in Figs. 6 and 13. The relay M3 is that for the west-bound home signal arm P and M4 for the west-bound distant signal arm $P^1$.

M2 is the relay for the east-bound home signal arm $P^2$ and M1 is the relay for the east-bound distant signal arm $P^3$. As will be described later, a west-bound train having once gained control over the section of track between A and B, no east-bound train can enter thereon, and therefore only west-bound signals will be cleared and operated, while the west-bound train is on the track, and vice versa for an east-bound train that gains control of the section.

Assuming that a west-bound train has gained control of the section, the relay M3, the west-bound home signal control, which as previously stated is normally deënergized, will become energized by means of a circuit that will be explained hereinafter. Referring to the selector mechanism shown in Fig. 6, it will be seen that each set comprises a plurality of circuit breakers 43—44, 50—51 and 54—55, which are so made that when one is closed, the other is opened, that is, when 43 is closed, 44 is open, and vice versa, and also so constructed, that the switches 54, 43 and 50 are closed or opened simultaneously, and therefore the switches 55, 44 and 51 will also be opened and closed simultaneously. Upon M3 becoming energized, the contacts 1—1 will be closed and current will flow from battery $G^2$ through 1—1 of M3, wire 42 to one side of each of the circuit breakers 43 and 44, and if 43 is closed, the current will flow by wire 45 to magnet M. L., thence by wire 46 back to the other side of battery $G^2$. The magnet M. L. controls the shifting appliances for the home signals for both east and west-bound trains, but it will be understood that the shifting mechanism for the home signal only operates one, east or west, which is selected by the selector mechanism. In the circuit just described, the switch 43 on the drawing is shown as closed, which indicated that the selecting mechanism was already set for a west-bound train. However, if switch 43 should be open and switch 44 closed, which indicates that the selector circuits for the shifting appliances have been left set for an east-bound train, it will be necessary to change the selector mechanism over to west-bound, and the circuits would be as follows: Current would flow from battery $G^2$ through contacts 1—1 of M3, through switch 44, wire 47 to magnet W. S. L., thence by wire 46 back to battery $G^2$. The energizing of W. S. L. operates the selector which will open the switch 44 (also 51 and 55) and close switch 43 (also 50 and 54). As soon as switch 43 is closed, the current immediately flows to magnet M. L. as before described, to operate the west-bound home signal. Upon the west-bound home signal clearing, the circuit breaker $b^1$ is thereby closed, and current will then flow through $b^1$ to relay M4. Upon M4 becoming energized, the contacts 1—1 thereof are closed and a circuit will then be established to operate the west-bound distant signal arm, the shifting mechanism for which is controlled by the magnets D. M. L. D. M. L. is energized by current from the battery $G^2$ passing through wire 148, points 1—1 of M4, wire 48, through D. M. L. and back to $G^2$ by wire 46.

For east-bound trains, the operation is as follows: The relay M2 (which is for the east-bound home signal) is energized, whereupon the contacts 1—1 of M2 are closed and current flows from battery $G^2$ through 1—1 of M2, wire 49, to one side of circuit breakers 50 and 51, of which one must be open and the other closed. If 51 is closed, current flows through it and through wires 52 and 45 to magnet ML and returns to $G^2$ via wire 46, and, as before stated, ML will operate the home signal for east-bound trains. If, however, the selector circuits were previously left set for west-bound trains, switch 51 would have been open and the switch 50 closed, whereupon the current would have passed through switch 50, wire 53 to E. S. L. and back via 46 to $G^2$. Upon E. S. L. becoming energized, which is the selector for the east-bound trains, the switch 50 would be opened and the switch 51 thereby closed, and the current would flow direct to M. L. as before. The home signal for east-bound trains having been cleared by the energizing of M. L., the circuit breaker $b^2$ is thereby closed, whereupon M1 becomes energized, and the contacts 1—1 of the same are closed, which establishes a circuit from $G^2$ to the magnet D. M. L. for the distant signal shifting appliances as follows: battery $G^2$, wire 153, 1—1 of M1, wire 53, magnet D. M. L. and return to $G^2$ by wire 46.

The selector magnets W. S. L. and E. S. L. have a common armature 571 (see Fig. 13), and from the preceding description, it will be seen that the current that operates either the E. S. L. or W. S. L. magnet, is cut off as soon as the selector operates, and I therefore provide an electric locking circuit to hold the armature in the position in which it is last placed. This is shown in Figs. 6 and 13. Each relay M3 and M2 is provided with back points 2—2 which are open when the magnets are energized, and closed when the magnets are deënergized, or, in other words, are open when the points 1—1 are closed and vice versa. If the selector is in the west position, switch 54 is closed, because, as previously stated, this switch is closed when switches 43 and 50 are closed, and current will flow from battery $G^3$ through 54, wire 56, back points 2—2 of M2 (which are closed while M2 is deënergized), wire 561 to wire 47 through W. S. L. and wire 46 back to $G^3$ and the armature 571 will thus be locked or retained by magnet W. S. L. until M2 is energized by an east-bound train. When M2 is energized, the circuit will be broken at 2—2 of M2, and the selector having closed the switch 55 (which is closed at the same time that the switches 51 and 44 are closed as previously described) current will flow from battery $G^3$ through 55, wire 57, back points 2—2 of relay M3 (M3 being deënergized, the contacts 2—2 thereof will be closed), then by wire 157, wire 53 through E. S. L. and back to $G^3$ by wire 46.

From the foregoing, it is thought that the operation of the selecting mechanism for the shifting appliances will be understood, since the operation is the same at each signal station.

In order to prevent any opposing circuits from being formed to operate or clear any opposing signals after a train has gained control of the track, I provide two unset relays 11 and 12 (see Figs. 2, 3 and 7) which are normally deënergized and in the position indicated in Fig. 7, the relay 11 being energized when a circuit is completed through it from the battery $C^2$ and relay 12 from the battery $C^1$, the circuit through $C^1$ being closed by a west-bound train closing the contact $x$—$x$ in relay 2, and the circuit through $C^2$ by an east-bound train closing the contacts $x$—$x$ in relay 9. When these relays have once been set, for instance, by a west-bound train, all opposing east-bound circuits are broken and kept broken until the west-bound train or trains have passed off of the section of the track between A and B, and have passed by station B. In order to show how the various circuits and signals are operated, I will describe the changes that take place when a west-bound train enters the section at A on subsection $a$, and disregard for the time being, the side track circuits which will be explained later, and assume that all track switches are set on the main line.

In each reversely operable relay 2, 3, 4, 5, 6, 7, 8, 9 and 10, as previously stated, the contacts 1—1, 2—2, etc., in each are normally closed because energized by the track batteries $B^1$, and the circuits between the contacts O—B in each case are normally broken or open. A train entering sub-section $a$ deënergizes one magnet of relay 2, and upon reaching sub-section $b$, the other magnet of the relay 2 is deënergized and a circuit is established between the points O and B at $x$—$x$, because it has been deënergized in the proper sequence. This establishes a circuit through the unset relays 11 and 12 from the battery $C^1$ as follows: (See Figs. 1, 2, 3 and 7.) From $C^1$ through points 1—7, of relay 11, to 4 of relay 12, through contact 257, and out at 3, thereby energizing magnet $A^{12}$, thence by 101 to 1—1 of circuit breaker H, (1—1 of H being closed since the track switch is set for the main track); out of H at 1—1, through wire 101 to O, relay 2, out at B, wire 102 through 1—1 of relay 3, wire 102 through 1—1 of relay 4, wire 102 through points 1—1 of relay 5, wire 102, back to the opposite side of battery $C^1$. The energizing of magnet $A^{12}$ of relay 12 attracts its armature on the bell crank 250, rocks 250, thus releasing its hooked end 258 from the end of bell crank 252, and compressing spring 251. Spring 253 then expands and rocks 252, until the end of the latter is opposite the face of 258, whereby the bell crank 258 is locked in the position it was placed by the magnet $A^{12}$. This action closes contacts at 254 and 255, and opens contacts 256 and 257, as will be apparent. The breaking of contact 256 breaks a circuit for an east-bound train that might be established from relay 9 through the points O—B and $x$—$x$ thereof to battery $C^2$ through points 1—7 of relay 12. The relay 12 will now stay in this condition until magnet $B^{12}$ is energized, but as will be clear later, $B^{12}$ cannot be energized until the train has passed the sub-sections $i$ and $j$ and after the west-bound train has passed sub-station $j$, any circuits for an east-bound train will be prevented at $S^1$ from being completed, because there will always thereafter be a break at one of the odd-numbered reversing relays through points O—B, which, as was described previously, will be deënergized by a west-bound train in the wrong sequence, thus preventing any circuit through any O—B points. When, however, $B^{12}$ is energized, it will attract its armature or bell crank 252, thus releasing 250, breaking contacts at 255 and 254, and reëstablishing contacts at 257 and 256. Relay 12 having now been set, a circuit is established to westbound home signal controlling relay M3 from battery $C^1$ through 1—7 of relay 11, in at 4 and out at 5 of relay 12, wire 103 through M3, wire 103 through 1—1 of H (1—1 being closed) wire 101, to O of relay 2, out at B, wire 102, through points 1—1 of each of relays 3, 4 and 5 back to battery $C^1$ as before. M3 having been energized, the selector mechanism and shifting appliances will operate in the manner previously described, thereby clearing the west-bound home signal arm at S1, which closes the switch $b^1$, and a circuit is then established through M4 as follows: from battery $C^1$ through 1—7 of relay 11 through 4—5 of relay 12, wire 105 (see Fig. 3) through 2—2 of reversely operable relay 6 (which is still energized), wire 105, through 4—4 of track relay $3^a$, (which is still energized and all the points of the same therefore closed), wire 105 back through M4, circuit breaker $b^1$, wire 103, 1—1 of H, wire 101 through O—B of relay 2, wire 102 through the points 1—1 of each of the relays 3, 4, 5, back to $C^1$ again. Both the home and distant signals at S1 are now clear. The train arriving next on sub-section $c$, short circuits the battery of that section and deënergizes track relay $1^a$, which opens all the contacts 1—1, 2—2, 3—3 and 4—4 thereof. The opening of points 1—1 in relay $1^a$ opens the circuit of the track battery that is connected to the rails of sub-section $d$, and which energizes one of the magnets in relay 3. As the magnet in relay 3, normally energized by this track battery, is deënergized, it breaks the connection between the points 1—1 of relay 3 (see Fig. 9) through which the clearing circuits for the station S1 all pass, thus breaking the clearing circuits for M3 and M4, and setting the signals at S1 at danger and caution. The relay 2 becomes energized again after the train has left sub-section $b$, thereby establishing connections between the points 1—1, 2—2, etc., and breaking the connection at $x$—$x$ between O—B. Relay 3 is deënergized in one magnet, as stated, when the train enters sub-section $c$, and will be held deënergized as the train passes over sub-sections $d$ and $e$, because the track batteries of these sub-sections will be shortcircuited in turn, thus breaking all the connections between the points 1—1, 2—2, 3—3 and 4—4 of relay 3, and at the same time preventing a connection between O—B of said relay, because the magnets thereof are deënergized in the wrong sequence.

On arriving at sub-section $f$, the battery of this sub-section is short circuited, and one of the magnets in relay 4 is deënergized, and on arriving at sub-section $g$, the other magnet is deënergized, and since relay 4 (even-numbered) is for west-bound trains, breaks will be made between all the points 1—1, 2—2, 3—3, 4—4 and 5—5 of relay 4, and a circuit made between O—B at $x^2$—$x^2$ (see Fig. 10), and a clearing circuit for signal station S2 will be established as follows: For the home signal of S2, current passes from battery $D^1$ (Fig. 3) by wire 106 through B and O of relay 4, wire 107 through M7, wire 107 through 3—3 of relay 5, thence by wire 107 through 4—4 of relay 6, wire 107 through 3—3 of relay 7, and back to the opposite side of battery $D^1$, and it will be remembered that each of the reversing relays 5, 6 and 7 is still energized, and that therefore the contacts between the points 1—1, 2—2, etc., are connected, while the circuits between the contacts O—B are open. When M7 is energized, the selector mechanism is operated and the westbound home signal cleared at signal station S2, whereupon the circuit breaker $b^1$ at S2 is closed, and a clearing circuit for the westbound distant signal established as follows: from battery $D^1$ through wire 106, through B—O of relay 4, wire 107, through circuit breaker $b^1$ at S2, through M8, wire 108, through 4—4 of relay $4^a$ (which is still energized and the contacts 1—1, 2—2, 3—3 and 4—4 thereof closed), wire 108 through 2—2 of relay 8, wire 108 through 4—4 of relay 7, and wire 107 back to $D^1$. The reversely operable relay 4 does not become reenergized until the train leaves the sub-section $g$, and when the train arrives on sub-section $h$, the track relay $2^a$ is deënergized, thereby opening the contacts 1—1, 2—2, 3—3 and 4—4 of the same, and upon the opening of the contact 1—1, the circuit of the track battery that is connected to sub-section $i$ is broken, thereby deënergizing one of the magnets of relay 5, and inasmuch as the clearing circuits for the signal station S2 all pass through the points 3—3 of relay 5, these clearing circuits are broken and the west-bound signals at S2 returned to danger. The train in traversing sub-sections $i$ and $j$ of the track, short circuits the track batteries and thus keeps relay 5 deënergized, similarly as was relay 3, i. e., in the wrong sequence. On arriving at sub-section $k$, the battery of this sub-section is short circuited, deënergizing one magnet of relay 6, the other magnet of which is deënergized when the train reaches sub-section $l$, when all connections are broken between the points 1—1, 2—2, etc., and O—B are connected at $x^1$—$x^1$. A clearing circuit for home signal at S3 is now established as follows: From battery $E^1$ (Fig. 4) current flows through 2—2 of circuit breaker $H^2$ (the points 1—1 to 5—5 of which are closed since the track switch is on the main line), from point 2 of $H^2$ by wire 110 through B—O of relay 6, wire 111 through M11, wire 111 through 2—2 of relay 7 (which is energized), wire 111, through 3—3 of relay 8, wire 111 through 2—2 of relay 9, back to battery $E^1$. M11 being energized, operates the selecting mechanism and the shifting appliances so as to set the home signal arm for west-bound trains at S3 at clear, whereupon the circuit breaker at $b^1$ at this signal station is closed, and a circuit for M12 made as follows: Current flows from battery $E^1$ through 2—2 of circuit breaker $H^2$, wire 110 through B—O of relay 6, wire 111 through $b^1$ of signal station S3 through M12, wire 112 through 3—3 of track relay $5^a$ (which is energized and all points 1—1, 2—2, 3—3 and 4—4 thereof closed), wire 113 through 3—3 of $H^3$ through 4—4 of relay 10, wire 113 through 3—3 of relay 9, back to battery $E^1$. The reversely operable relay 6 remains deënergized until the train passes off of sub-section $l$, and the train on arriving on sub-section $m$, track relay $3^a$ is deënergized, thereby breaking the connections between the points 1—1, 2—2, 3—3 and 4—4 thereof, and the opening of points 1—1 breaks the circuit of the track battery that is connected to the sub-section $n$, whereby one of the magnets of relay 7 is deënergized. The relay 7 is held deënergized as the train passes over sub-section $n$ and $o$, thereby breaking the connection between points 1—1, 2—2, etc., of relay 7, and breaking the clearing circuits for the signal station S3, which all pass through relay 7, whereupon the signal arms of S3 for west-bound trains are set at danger.

On arriving at sub-sections $p$ and $q$, the magnets of relay 8 are deënergized in proper sequence in a manner similar to the deënergization of relays 2, 4 and 6, as previously described, and connection made between O—B of relay 8 through contacts $x^1$—$x^1$, whereupon a clearing circuit is established for the home signal at S4 as follows: Current flows from battery $F^1$ (see Fig. 5) by wire 114, through B—O of relay 8, wire 115 through M15, wire 115 through 5—5 of circuit breaker $H^2$ (5—5 of $H^2$ being closed, since the track switch is on the main line), from 5 of $H^2$ by wire 115, through 5—5 of relay 9, wire 115 through circuit breaker 28 at signal station S5 (said circuit breaker 28 being closed when east-bound signals at S5 are at danger), from circuit breaker 28 by wire 116 through 4—4 of circuit breaker $H^3$, through 6—6 of relay 10 to $F^1$. M15 being energized, the selector mechanism and shifting appliances at S4 are operated and the west-bound home signals cleared, thereby closing the circuit breaker $b^1$ at S4 and establishing a clearing circuit for M16 as follows: Current flows from battery $F^1$ through wire 114, through B—O of relay 8, wire 115, through circuit breaker $b^1$ at signal station S4, through M16, wire 117 to track relay in the next section beyond the last shown in the drawings, and corresponding to relay $2^a$, back through contacts on relays (not shown), corresponding to relays 3 and 4, wire 118 which attaches to wire 115, wire 115 through circuit breaker 28, wire 116 through 4—4 of $H^3$ through 6—6 of relay 10, back to $F^1$. The circuit through B—O of relay 8 is held closed until the train leaves sub-sections $q$ and upon the train reaching sub-section $r$, track relay $4^a$ is deënergized, thereby opening the contacts 1—1, 2—2, 3—3 and 4—4 thereof, which breaks the circuit that passes through 1—1 of relay $4^a$ of the track battery that energizes one of the magnets of reversing relay 9. Hence relay 9 will have one of its magnets deënergized, and the circuit broken between the points 1—1, etc., thereof, which will break the clearing circuits for signal station S4, and the signal arms at S4 for west-bound trains will be set to danger. Relay 9 will be held deënergized as the train passes over sub-sections $s$ and $t$, and sub-sections $u$ and $v$ correspond to those at $a$ and $b$ at the passing station A, and hence the signals for signal station S5 are operated similarly to those at signal station S1, and the relay 10 corresponds to relay 2.

All the circuits for the signal arms have thus been traced for a train running west between the passing stations A and B, and those for an east bound train are similar, and I shall only describe those for signal station S4.

The unset relays 11 and 12 are in the condition as shown in the drawings, and an east-bound train, having passed onto the sub-sections $t$ and $s$, will deënergize the magnets of relay 9 in the proper sequence to form a connection between the points O and B through contacts $x$—$x$ (see Fig. 8), and a circuit will then be established through the relays 11 and 12 as follows: Starting at battery $C^2$ (Fig. 3), current will flow through relay 12, through posts 1 and 7 (see Fig. 7), from 7 to relay 12 to 4 of relay 11 and out at 3, thereby energizing magnet A of relay 11, from 3 by a wire through points 1—1 of circuit breaker $H^2$, thence through O—B of relay 9, from B through 1—1 of relay 8, through 1—1 of relay 7, through 1—1 of relay 6, back to battery $C^2$,—it being understood that relays 8, 7 and 6 are energized at this time. Magnet A of relay 11 having been energized, the same movements of the armatures take place as in relay 12, which breaks the circuits in relay 11 between the posts 4 and 3, and 1 and 7, and establishes connections between points 4 and 5 and between points 2 and 6, and the relay 11 is thus locked into position until the magnet B of the same is subsequently energized. A circuit for clearing the east-bound home signal at S4 is now established as follows: From battery $C^2$, through 1—7 of relay 12, through 4—5 of relay 11, from 5 through M14, from M14 through 1—1 of $H^2$ through O—B of relay 9, 1—1 of relay 8, 1—1 of relay 7, 1—1 of relay 6, back to $C^2$. M14 being now energized, the selector mechanism for east-bound signals and the shifting appliances will be operated, and the home signal, east-bound, at S4 cleared, thereby closing circuit breaker $b^2$ at S4 and a circuit for clearing the distant east-bound signal through M13 will be made as follows: Current flows from battery $C^2$ through 1—7 of relay 12, through 4—5 of relay 11, from 5 of relay 11, through 2—2 of relay 5, through 4—4 of track relay $2^a$, from 4 of relay $2^a$ to wire 105, wire 105 back through M13, through circuit breaker $b^2$ of S4, through 1—1 of $H^2$, through O—B of relay 9, and then through 1—1 of each of relays 8, 7 and 6 back to $C^2$. Both east-bound signals at S4 will now be cleared, but as soon as the train reaches sub-section $r$, track relay $4^a$ will be deënergized, thereby opening the points 1—1, 2—2, 3—3 and 4—4 of relay $4^a$, which will break the circuit of the track battery connected to sub-section $q$, which passes through the points 2—2 of relay $4^a$. Thereupon, one of the magnets of relay 8 is deënergized, which breaks the clearing circuits for the east-bound signals at S4, and these signals then go to danger. Relay 8 will be held deënergized as the train passes over sub-sections $q$ and $p$, thereby keeping the points 1—1, etc., of relay 8 open, and inasmuch as the magnets of relay 8 (an even-numbered relay) are deënergized in the wrong sequence, no connection will be established between the points O and B of the same. The east-bound train next operates the relay 7 to make clearing circuits for S3, and the steps continue as for a west-bound train, only in the reverse order.

*Unsetting of relays 11 and 12.*—As the west-bound train passes from sub-section $j$, the reversely operable relay 5 becomes energized again from the track battery, as have also previously the relays 4, 3, 2 and the locking mechanism of relay 12 is released by the following circuit which energizes the magnet $B^{12}$ thereof: Current flows from battery $C^1$ through 1—7 of relay 11 into 2 and around $B^{12}$ of relay 12 and out at 6, then by wire 104 through 1—1 of relay 2, thence from 1 of relay 2 to B of relay 2 (see Fig. 8) and from B of relay 2 by wire 102, through points 1—1 of each of relays 3, 4 and 5. The relay 12 is now unset, and a west-bound train may enter the track following the first west-bound train, but the first west-bound train having now reached sub-section $k$, one of the magnets of relay 6 will be deënergized, thus breaking any circuit that goes through battery $C^2$ for an east-bound train and points 1—1 of relay 6. As the first west-bound train proceeds, contacts will be broken in the relays 7, 8 and 9, so that no complete circuit for an east-bound train can be established until every west-bound train between the passing stations A and B have passed by B, because all east-bound circuits will be broken either by the first train through the relays 11 and 12, or when the first train has passed beyond relays 11 and 12, by the breaks in the circuits of the relays 6, 7, 8 and 9, and the first train having passed an east-bound train on the side track at B, with another west-bound train following, no clearing circuits for the east-bound train can be established, because of the rear west-bound train.

When one west-bound train follows another, the rear train cannot get a clearing circuit for the signals at S1 until the preceding train has passed beyond the sub-section $j$ for the following reasons: As was described previously, the clearing circuits for S1 all pass through the relays 2, 3, 4 and 5, of which 3, 4 and 5 must be energized in order for the circuits to be made between any of the points 1—1, 2—2, etc., of each, but so long as a train is on any of the subsections from $d$ to $j$ inclusive, there is always one or more of the magnets of one of these relays (3, 4, 5) deënergized, thus preventing any clearing circuits for the following westbound trains, even though the latter has deënergized relay 2 to establish a connection between the points O—B thereof.

I will now describe the circuits and operations for trains when the side tracks are used.

The circuit for clearing the signals at S1 for a train going west and coming off of the side track $R^2$—$R^3$ is as follows: The circuit for one of the magnets in relay 2,—that one energized by the track battery for sub-section $a$,—passes through the points 3—7 of side track relay $6^a$, points 3—7 of which are normally closed, i. e., when the rail switch for the side track is set for the main line, because current flows from battery $G^6$ (see Fig. 1) through wire 119 to post 1 of relay $6^a$, out at 5, wire 120 to rail $R^2$ and directly back to battery $G^6$. When the rail switch is set for the siding, the magnet of relay $6^a$ is deënergized, thus opening the points 2—6 and 3—7 of relay $6^a$ and closing the back points 4—8 thereof. When the rail switch is set for the siding, circuit breaker H is mechanically operated, as previously stated, thereby opening the points 1—1 to 5—5 inclusive, and closing the points 6—6, 7—7 and 8—8. This short circuits the magnet of relay $6^a$, which is energized by the side track battery $G^6$, because the battery $G^6$ will be short circuited as follows: Current from $G^6$ will pass by wire 119 to post 1 of relay $6^a$ from 1 through wire 121, through points 8—8 of circuit breaker H (which are now closed), wire 121 to rail $R^3$ through the axle of the train to rail $R^2$ and back to $G^6$.

The circuit for clearing the signals at S1, which, when a train was on the main line and the switch set for the main line, passed through the points 1—1 of circuit breaker H, is broken at these points, because the rail switch is set for the side track and the circuits for clearing S1 are as follows, when relay 2 is deënergized and a circuit established between the points O—B: The gap caused by the opening at 1—1 of H is bridged by a wire 122 attached to wire 101 on one side of H, and current flows through 122 through back points 8—4 of relay $6^a$ (now deënergized), thence by wire 122 to wire 101 on the other side of 1—1 of H. In order to prevent the breaking of the clearing circuits for S1 after the end of the train has left the side track, and leaving the rail switch set for the side track before the train has reached S1, I provide a patch for this circuit as follows: Wire 123 attaches to wire 101 on one side of 1—1 of H, and current passes through wire 123, through a circuit breaker 29 at S1, which is closed by the home signal arm for west-bound trains when at clear, back by wire 123 to wire 101 on the opposite side of 1—1 of H, thereby bridging the break at 1—1 of H while the rear of the train is on the siding, and bridging the gap at 8—4 of relay $6^a$, when the latter becomes energized.

I will now describe the circuits for clearing the signals at a signal station when the rail switch is set to pass the train onto the side track in order to pass a waiting, oppositely bound train on the main line, and this will be done in connection with signal station S4 for a west-bound train.

When the rail switch is set to pass a train onto the side tracks $R^4$ and $R^5$ (see Fig. 4) the points 1—1 to 5—5, inclusive, of circuit breaker $H^2$ are thereby opened and the points 6—6, 7—7 and 8—8 closed, and it is necessary to bridge the gap caused by the opening of points 5—5 of circuit breaker $H^2$ through which all the clearing circuits for S4 for west-bound trains pass. This gap is bridged by a wire 124 attached to 115 on one side of 5—5 of $H^2$, which connects with points 7—7 of $H^2$ (now closed), wire 124, through points 2—6 of side track relay $7^a$, wire 124 to back point 2 of relay 9, which is connected to lower post 5 of relay 9 (see Fig. 8) to which is attached wire 115. By again referring to Fig. 8 it will be seen that when a train is in section T and the relay 9 deënergized, the back contact 204 is closed and the contacts 3″, 4″, 5″ and 6″ are open, and that the contact 5′ is still closed because the magnet on its relay has not been deënergized.

*Speed control.*—At each signal station, speed control is obtained by the following means, which are identical in operation at each of the signal stations, and so it will only be necessary to describe the operation at one station. As previously described, there are provided at each signal station two automatic train stops or tracks instruments L and $L^1$, so mechanically connected, that when one is set for stopping the train, the other is clear, and vice versa. Referring to Fig. 1, it will be seen that one side of the track battery $B^1$ for the sub-section $b$ of the track, which energizes one magnet of relay 2, is directly connected to the rail R of the sub-section $b$ by wire 132, and the other side connected by a circuit passing through points 2—2 of relay $1^a$ and wire 133 attached to rail $R^1$ of sub-section $b$. In like manner, one side of the track battery $B^1$ for the sub-section $d$ that energizes one of the magnets of relay 3, is directly connected to rail R of sub-section $d$ by wire 134, and the other side of the battery circuit passes through points 1—1 of relay $1^a$ and by wire 135 to rail $R^1$. As will be remembered, all the points 1—1, 2—2, 3—3 and 4—4 of relay $1^a$ are closed when no train is on sub-section $c$, and as previously described and as shown in Fig. 14, the circuit breakers 40 and 41 are closed when the distant signals P¹ and P³ stand at caution. Wire 136 attaches to the battery wire of the track battery for sub-section $b$ between the battery and the points 2—2 of relay 1ª, and leads to the circuit breaker 40, closed when distant signal for east-bound train at S1 stands at caution and then from circuit breaker 40 by wire 137, wire 133 on the opposite side of the points 2—2 of relay 1ª, so that the break caused by the points 2—2 of 1ª when opened, is bridged when the distant east-bound signal is at caution. A similar bridging circuit is provided by wires 138 and 139 and circuit breaker 41 when west-bound signal at S1 is at caution.

The track instruments are so arranged and operated that the one first approached by the train is at danger when the home signal is at danger, and if the home signal clears, the track instrument would clear, thus setting the distant track instrument at danger. As the train passes the signal station, the home signal will again go to danger, thereby resetting the track instrument so as to allow the train to now pass over the second track instrument safely.

In the drawings, for a west-bound train, L would be at danger when the west-bound home arm P is at danger, and L¹ would be at clear. As home arm P clears, L will clear and L¹ will be set at danger, and it becomes necessary before the train reaches L¹ for an arm P to go to danger. As previously stated, if arm P¹, which is for west-bound trains, clears, then circuit breaker 41 will be opened. With both the home and distant signals of S1 cleared, as soon as the train enters sub-section $c$ of the track, relay $l^a$ will be short circuited, thereby opening all points of relay $l^a$ and breaking the circuit for the track battery that energizes one of the magnets of relay 3, and when relay 3 is de-energized, the clearing circuits for S1 are broken, whereupon the signal arms return to danger. The shifting appliances, therefore, have all the time while the train is traversing sub-section $c$ in which to shift the signal arms and to thereby reverse the track instruments, so that L¹ will be clear and L returned to danger. If, however, west-bound home signal P of S1 clears and the west-bound distant signal P¹ does not clear, the circuit breaker 41 will remain closed and the train upon entering sub-section $c$ will not cut out the track battery for sub-section $d$, because of the circuit through closed switches 41 which bridges the open points 1—1 of relay $l^a$ and therefore relay 3, being still energized, the clearing circuits for S1 will not be broken until the train reaches sub-section $d$. This will now allow the shifting appliances to operate, but the train has only a short distance to travel from the end of sub-section $d$ before it encounters the track instrument L¹, and as it takes an appreciable amount of time for the shifting appliances to operate, the train will be stopped by the track instrument L¹ before the shifting appliances have had a chance to operate, unless the train has reduced its speed sufficiently to allow the shifting appliances to reverse while the train is traveling from the end of sub-section $d$ to a point opposite L¹. The subsections of the track $c$ and all the other corresponding subsections, namely, $h$, $m$, $r$ and $w$ are relatively short, and, in actual practice, are made of less length than the length of the shortest possible train which would run over the track, or, in other words, said subsections of track are made of a length not greater than the length of a locomotive and its tender, so that a westbound train in passing from the subsection $b$ of the track to the subsection $c$ and from the other corresponding subsections at the other signal stations, will always keep the track battery on said subsection of track $b$ short circuited until the front wheels of the locomotive have reached the subsection of track $d$. This will prevent the second magnet of the reversely operable relay 2 from becoming energized, or, in other words, will prevent the breaking of the contact between the points O—B of said relay at least until the front part of the train has reached the subsection $d$, and hence, so long as said track battery for the subsection $b$ is short circuited, the westbound home signal arm will not go to danger. Hence it will be seen that by varying the distance between the track instrument L¹ and the end of sub-section $d$, that it is possible to compel an engineer of a westbound train to slow up his train to any predetermined speed, or else stop him entirely, when the distant signal indicates caution. By varying the distance of the track instrument L from the end of sub-section $b$, the same results are obtained in the case of eastbound trains as above described for a westbound train.

It will be understood that various changes in the systems of wiring hereinbefore described may be made without departing from the scope of my invention. The length of track controlled by any one of the several signals may be increased or decreased with reference to each other or independently, and circuits can be combined to reduce wiring or the number of contacts. Furthermore, relays may be introduced in different circuits to reduce the line of resistance.

I claim:

1. The combination of a series of blocks, signals for each block having clear, caution and danger positions, train stops for each block and having operative and inoperative positions, means normally set into operation when a train is at a predetermined distance from a train stop for moving the same to inoperative position, and means governed by the corresponding signal when in caution position for delaying the operation of said first mentioned means, substantially as specified.

2. The combination of a series of blocks, a visual signal having clear, caution and danger positions, a train stop having operative and inoperative positions corresponding to the clear and danger positions of said signal, train controlling means for moving said stop from one position to the other, and means for delaying the movement of the stop from danger to clear position when the signal is at caution position, substantially as specified.

3. The combination of a series of blocks, signals for each block having clear, caution and danger positions, train stops for each block having operative and inoperative positions, means normally set into operation when a train comes within a predetermined distance from a stop for moving the same to inoperative position, and means governed by the corresponding signal when in caution position for delaying the operation of said first-named means until the train has traveled a predetermined distance nearer the stop, substantially as specified.

4. In combination: a track composed of a series of blocks; a signal station for each block, each station having signal arms adapted to indicate safe, caution and danger; circuits for governing the position of the danger signals; circuits governing the position of the caution signals and dependent upon the operation of the danger signals; a pair of spaced train stops for each signal station, the train stops having operative and inoperative position and being always in opposed relation to each other; and means for shifting the positions of said train stops while a train is traversing the portion of the track between the same, substantially as specified.

5. In combination: a track having a series of blocks; signal stations for each block, each signal station having two signal arms normally indicating danger and caution respectively; circuits governing the positions of said signal arms; train stops corresponding in number to the signal stations and having operative and inoperative positions and operated in conjunction with the danger signal arms and means controlled by the signal arms when in caution position for delaying the normal operation of said train stops, substantially as specified.

6. In combination: a series of blocks; signals for each block having signal arms normally indicating danger and caution; a pair of spaced train stops operative in conjunction with each set of signals, each pair of train stops having both operative and inoperative positions and always in opposed relation with each other; means for shifting the positions of the train stops in correspondence with the movements of said signal arms; and circuits governing the positions of the signal arms, the circuits governing the caution signal arms being formed subsequent to the formation of the circuits for the danger signal arms and dependent upon a movement of the danger signal arms, substantially as specified.

7. In combination, a section of track divided into a plurality of blocks, a signal station at the end of each block, each signal station having signal arms normally indicating danger and caution, electrically controlled means for operating said signals and adapted to clear the danger signal when there is no train in the block beyond the signal station as a train approaches it, and adapted to clear the cautionary signal when there is no train in either the first or second block beyond the signal station as a train approaches it, means for stopping a train when the danger signal does not clear, said means being also adapted to compel a train to reduce speed if the danger signal clears and the cautionary signal remains at caution, said last named means comprising spaced track instruments mechanically connected together so that when one is set to stop a train, the other will allow a train to pass by without stopping it, and vice versa.

8. The combination of a section of single track divided into blocks, a signal station at the entrance of each block, a controlling circuit for trains traveling in each direction, both of said controlling circuits having an unset relay, each relay controlling the other relay; means operated by a train entering the section for setting the corresponding relay, thereby rendering impossible the setting of the other relay, train controlled means for unsetting said relay when the train has passed a predetermined point in the section, and means operated by the train as it proceeds from said point for interrupting the circuit of said other relay at successive points, substantially as specified.

9. In combination: a section of single track having passing stations at the ends thereof and divided into blocks; signal stations at the ends of said blocks, each signal station having a set of danger and caution signal arms for trains going in both directions; a controlling circuit having included therein a normally unset relay; signal governing circuits; and track circuits having included therein reversely operable relays which control the conditions of contacts included in the signal governing circuits, said normally unset relay controlling contacts in a signal governing circuit, substantially as specified.

10. In combination: a single track having passing stations and divided into blocks;

signal stations at the ends of each block, each signal station having means for indicating danger and caution for trains going in both directions; circuits having included therein a pair of normally unset relays, one of said relays being set by a train when it first enters the portion of single track between the passing stations, the relay which is set being dependent upon the direction of movement of the train; track circuits having included therein reversely operable relays; and signal governing circuits having contacts included therein, the positions of which are governed by said unset relays and directly by the reversely operable relays, substantially as specified.

11. In combination: a section of single track divided into blocks; signal stations at the ends of each block, each signal station having home and distant signal arms for trains going in both directions; track circuits each having a magnet included therein, the magnets of adjacent track circuits being arranged in pairs and each pair coöperating to form a reversely operable relay; a controlling circuit for said section of track having included therein a normally unset relay; signal governing circuits having contacts operated by said reversely operable relays and the unset relay; and track relays for each block, each track relay operating contacts included in one of the track circuits for each of the reversely operable relays, substantially as specified.

12. In combination: a track divided into blocks; signal stations at the ends of said blocks, each signal station having means for indicating danger and caution for trains going in each direction; shifting mechanism for said signaling means; and means for controlling the operation of said shifting mechanism including track circuits having a magnet, the magnets of adjacent track circuits being arranged in pairs and each pair coöperating to form reversely operable relays, and signal circuits having contacts therein operated by said relays, a series of alternate ones of said relays all being deënergized in a similar manner by a train going in one direction, and the other series of alternate ones of said relays being deënergized in a different manner, whereby only the signal circuits are made which are in accordance with the direction of the train, substantially as specified.

13. In combination: a section of main track having a passing side track; signal stations at each end of said section of main track, each signal station having means indicating danger and caution for trains going in both directions; signal governing circuits for the signaling means at each signal station, each signal governing circuit having included therein a circuit breaker operated by a rail switch for the side track and being open when said switch is open; and patch circuits bridging the circuit breaker causing caution indication for two oppositely moving trains approaching said signal stations when the rail switches are set to pass one train onto the main track and the other train onto the side track, substantially as specified.

14. In combination: a section of single track having a passing side track; signal stations at the ends of said section of track, each signal station having signal arms normally indicating danger and caution; signal clearing circuits; circuit controllers operated by the rail switches and controlling said signal circuits, means controlled by an approaching train for causing the signal at one station to indicate caution when the signal at the other station indicates danger and an oppositely moving train is at a predetermined distance in the rear thereof, and means controlled by the oppositely moving train for clearing said last named signal only when the first named train has entered the main track between the rail switches and the adjacent rail switch has been set to pass the opposing train onto the siding, substantially as specified.

15. In combination: a section of single track having a passing side track; a signal station at each end of said section of track, each signal station having arms normally indicating danger and caution for trains going in both directions, circuits for said signal arms; circuit controllers operated by the rail switches and controlling said signal circuits, means controlled by an approaching train for causing the signal at one station to indicate caution when the signal at the other station indicates danger and an oppositely moving train is at a predetermined distance in the rear thereof, and means controlled by the oppositely moving train for clearing said last named signal only when the first named train has entered the main track between the rail switches and the adjacent rail switch has been set to pass the opposing train onto the siding, train stops having operative and inoperative positions; and means, for delaying clearing action of said train stops to govern the speed of a train, substantially as specified.

16. In combination: a section of single track divided into blocks; signal stations at the ends of each block, each signal station having signaling means for trains moving in both directions; common mechanism for operating the signaling means at each signal station; and means for controlling said operating mechanisms in accordance with the direction of movement of the train, said means including track circuits, signal circuits having contacts included therein operated by relays in said track circuits, each signal circuit having also included therein a relay corresponding to the direction of movement of the train for governing said operating mechanism, substantially as specified.

17. In combination: a track divided into blocks; signal stations at the ends of the blocks, each signal station having visual signaling means; mechanism for operating the signaling means at each signaling station; and means controlling the operation of said mechanism in accordance with the direction of movement of the train, said means including selector circuits for each direction of movement of the train, each selector circuit having a selector magnet included therein governing said operating mechanism, a common armature for the selector magnets, and an electric locking circuit to hold said armature in position after being set by one of the selector magnets, substantially as specified.

18. In combination: a section of single main track provided with a passing side track; a signal station having a visual signal at one end of said section of track; mechanism for operating said visual signals; and circuits governing the operation of said mechanism, said circuits having included therein a circuit breaker mechanically operated with the rail switch for said side track, a patch circuit bridging a break in said circuits when the signal has been cleared, substantially as specified.

19. In combination: a section of single main track and a passing side track; a signal station at one end of said main track having signal arms; mechanism for operating said signal arms; and means controlling the operation of said mechanism, said means including main signal clearing circuits having included therein a circuit breaker operated with the rail switch, and a patch circuit bridging a break in the main signal circuits when the rail switch is set for the side track after the train leaves the side track and before the same reaches the signal station, substantially as specified.

20. In a block signaling system, the combination of signals governing opposing train movements through the block; a control relay for each signal, each relay controlling its own signal and the other relay, whereby the operation of one relay to change the indication of its signal acts to free itself from control by the other relay; track circuits adapted to be operated by a train in the block and controlling both of said control relays; and preliminary track circuits beyond the ends of the block, each controlling the control relay for its end of the block.

BENTON C. ROWELL.

Witnesses:
H. W. MUNDAY,
EDW. S. EVARTS.

Copies of this patent may be obtained for five cents each, by addressing the "Commissioner of Patents, Washington, D. C."